United States Patent

Wilson

[11] 3,897,675
[45] Aug. 5, 1975

[54] SKIN-PACKAGING MACHINE

[75] Inventor: Peter Gordon Wilson, Leeds, England

[73] Assignee: Baker Perkins Holdings Limited, Peterborough, England

[22] Filed: Mar. 5, 1974

[21] Appl. No.: 448,272

[30] Foreign Application Priority Data
Mar. 14, 1973 United Kingdom.............. 12198/73

[52] U.S. Cl............................................. 53/112 A
[51] Int. Cl........................................... B65b 33/00
[58] Field of Search....................... 53/22 A, 112 A

[56] References Cited
UNITED STATES PATENTS
3,071,905 1/1963 Morse................................. 53/22 A
3,830,365 8/1974 Krueger et al................ 53/112 A X

*Primary Examiner*—Travis S. McGehee
*Attorney, Agent, or Firm*—Watson, Cole, Grindle & Watson

[57] ABSTRACT

A method for the continuous production of air-free skin packages which comprises advancing a heated imperforate lower web of thermoplastic material having a dimpled centre section and carrying a spaced procession of articles, feeding an imperforate upper web of thermoplastic material into position above the advancing lower web and applying suction from beneath the lower web to cause the webs to become sealed together in the areas surrounding the articles on the lower web and the upper web to make close contact with the articles.

3 Claims, 5 Drawing Figures

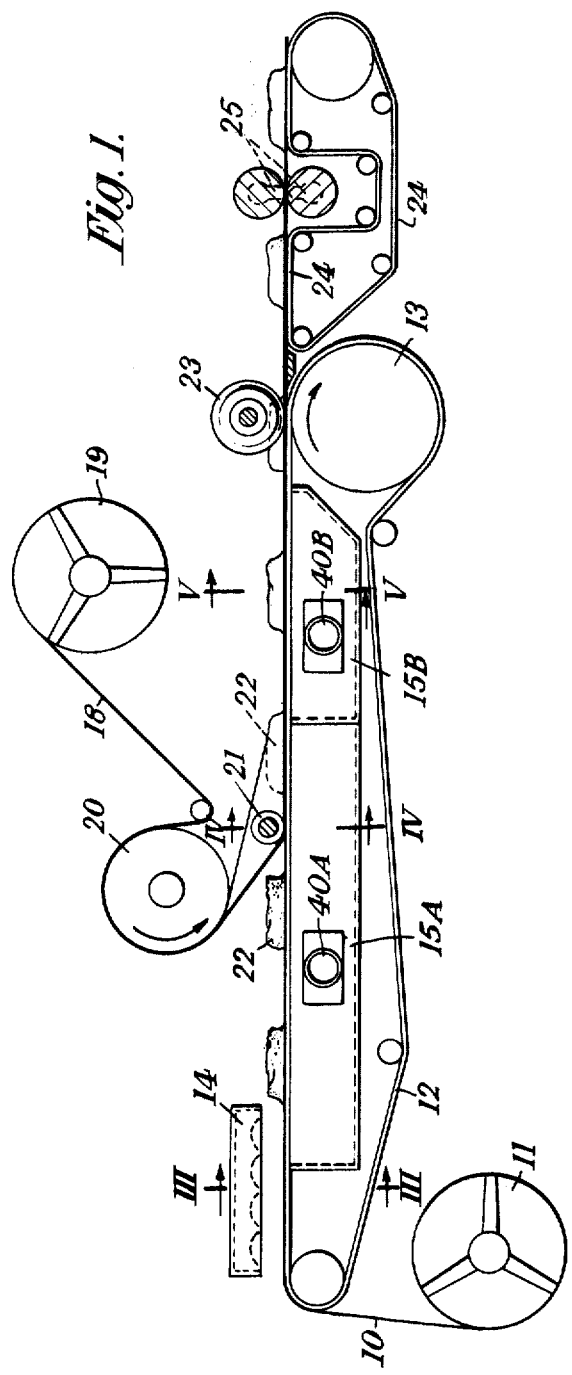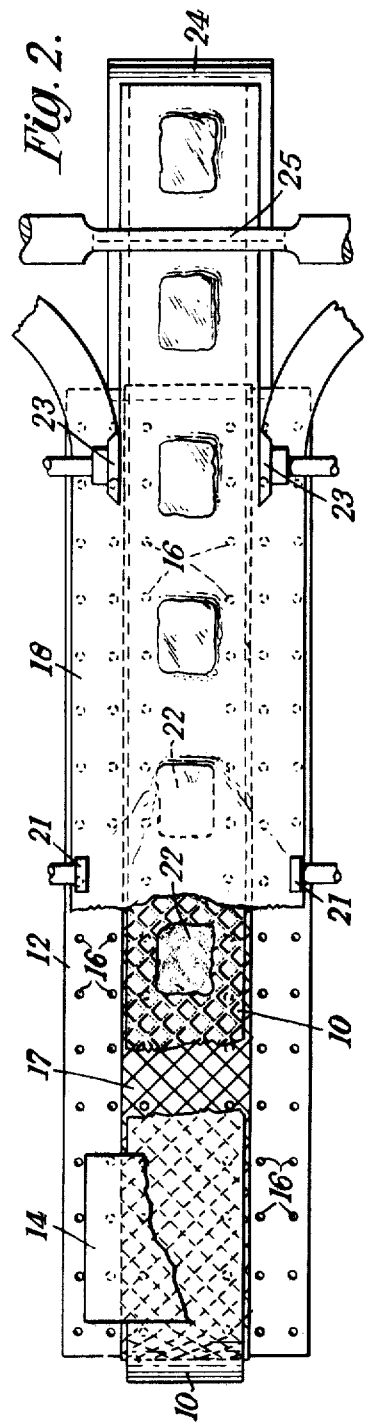

SKIN-PACKAGING MACHINE

This invention provides a method and machine for providing air-free skin packages, constituted by top and bottom layers of thermoplastic material which are sealed together at their edges and enclose an article of irregular shape, the upper layer conforming to the shape of the article.

Hitherto skin packages have been produced continuously on a machine from upper and lower webs of thermoplastic material by applying suction to the interior of the packages to cause an upper web to conform to the shape of the enclosed articles, the suction being applied through perforations in the lower web. Consequently the packages are not airtight.

This invention is based on the principle of using as a lower web an impervious web of thermoplastic material having a dimpled surface and carried over a suction box by a perforated conveyor. The suction applied by the suction box permits of the formation of air free skin packages since air can be drawn sideways across the lower web due to the air passages available between the dimples.

The lower web can be a web with preformed dimples but preferably the machine is arranged to effect dimple formation in a smooth lower web of thermoplastic material by the use of a perforated conveyor having a dimple forming centre section on to which the lower web is drawn by suction after it has been heated and prior to application to it of the upper web.

One embodiment of packaging machine according to the invention will now be described in detail, by way of example, with reference to the accompanying drawing in which:

FIG. 1 is a side elevation of the machine,

FIG. 2 is a plan view, and

Figure 3:
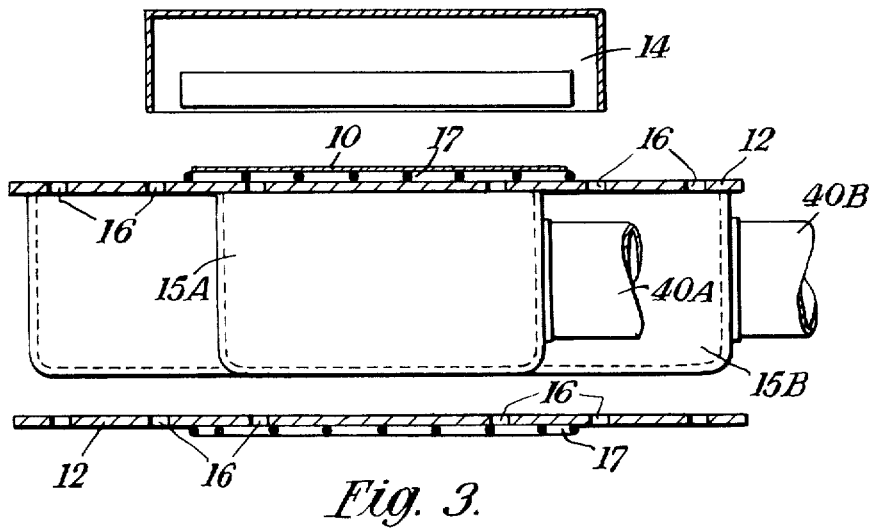
FIGS. 3, 4 and 5 are cross sectional views on a larger scale taken respectively on the lines III—III, IV—IV and V—V in FIG. 1.
Figure 4:
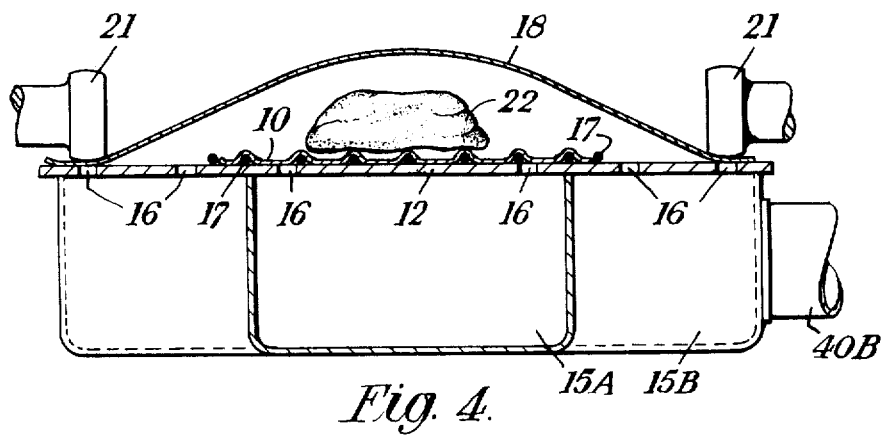

A lower imperforate web 10 of thermoplastic material is withdrawn continuously from a reel 11 by the action of a conveyor belt 12, having perforations 16 (FIG. 2) and a centre section 17 of open mesh woven material, which is driven by a drum 13. After it has been softened by exposure to a radiant heater 14, the web 10 is drawn down by suction applied through the perforations 16 by succeeding and adjoining suction chambers 15A and 15B, having suction pipes 40A, 40B, on to the woven section 17 of the conveyor belt, which causes the web 10 to become heavily dimpled as shown in FIG. 4. The suction chamber 15A is narrow and applies suction only to the woven section 17 of the belt. The suction chamber 15B is wider and applies suction to the full width of the belt.

Figure 5:
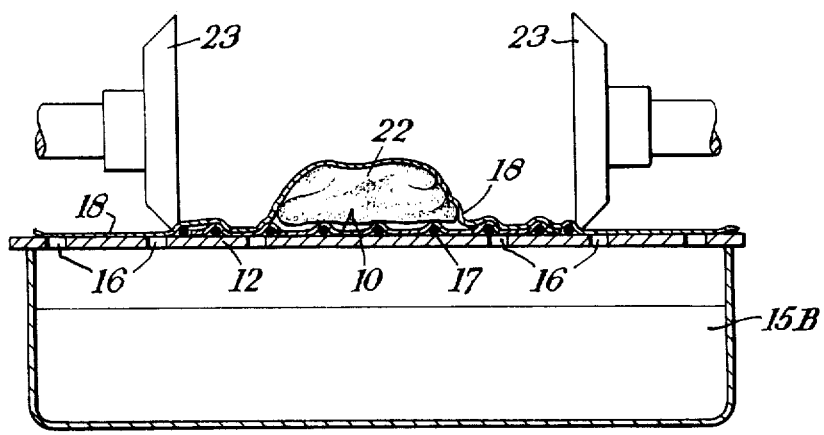

An upper imperforate web 18 of thermoplastic material is drawn from a reel 19 by a heated drum 20 and its edges are pressed against the conveyor belt 12 by rollers 21. The web 18 thus becomes arched, as shown in FIG. 4, over irregularly shaped articles 22, which are placed at intervals manually or automatically on the centre section of the lower web 10 which becomes dimpled as described above. An air seal is thus formed between the belt 12 and the edges of the upper web 18. The suction applied by the suction chamber 15 continues to draw air from the enclosure because air can leak sideways between the dimples on the lower web 10 which prevent the upper web 18 from making close contact with its surface when, as shown in FIG. 5, it is forced by atmospheric pressure into contact with the irregular surface of each article 22 as the webs continue to travel forward and are gradually brought into close contact with the lower web in the areas surrounding the articles 22 to form an air tight seal as shown in FIG. 5.

The webs 10 and 18 continue to an edge trimming and cut off section, in which the edges of the webs are cut off by trimming knives 23. They proceed from the conveyor 12 to a discharge conveyor 24, which carries them beneath rotary knives 25, which sever the webs transversely to produce individual packages 26.

As an alternative to providing the lower web 10 with a dimpled surface on the machine, a pre-dimpled lower web in reel form may be used, air being sucked from the packages in the same manner.

What I claim as my invention and desire to secure by Letters Patent is:

1. A packaging machine for the continuous production of air-free skin packages, comprising a suction box, a perforated conveyor arranged for movement over said box, the center section of said conveyor being of open-mesh woven material, a lower imperforate web of thermoplastic material overlying said conveyor at said center section thereof, said lower web carrying spaced articles to be packaged, a heater for heating said lower web during its movement by said conveyor over said suction box whereby said lower web is drawn against said woven material section to thereby effect a dimpled upper surface therefor, and means for feeding an upper imperforate web of thermoplastic material and guiding its edges into contact with said upper surface of said lower web as the latter moves over said suction box.

2. A machine as claimed in claim 1 which includes trimming knives for trimming the edges of the superposed webs.

3. A machine as claimed in claim 1 which includes rotary knives for severing individual packages from the superposed webs.

* * * * *